(12) United States Patent
Cannon et al.

(10) Patent No.: US 7,859,733 B2
(45) Date of Patent: Dec. 28, 2010

(54) MULTIHARMONIC GALVONOMETRIC SCANNING DEVICE

(75) Inventors: Roger Steven Cannon, Nicholasville, KY (US); Daniel Richard Klemer, Lexington, KY (US)

(73) Assignee: Lexmark International, Inc, Lexington, KY (US)

( * ) Notice: Subject to any disclaimer, the term of this patent is extended or adjusted under 35 U.S.C. 154(b) by 0 days.

(21) Appl. No.: 12/505,729

(22) Filed: Jul. 20, 2009

(65) Prior Publication Data

US 2009/0279155 A1 Nov. 12, 2009

Related U.S. Application Data

(62) Division of application No. 11/176,056, filed on Jul. 7, 2005, now Pat. No. 7,573,625.

(51) Int. Cl.
*G02B 26/08* (2006.01)
(52) U.S. Cl. .............. 359/199.1; 359/199.2; 359/199.3; 359/199.4; 359/213.1
(58) Field of Classification Search ... 359/199.1–199.4, 359/213.1–215.1
See application file for complete search history.

(56) References Cited

U.S. PATENT DOCUMENTS

| | | | |
|---|---|---|---|
| 5,543,956 A | 8/1996 | Nakagawa et al. | |
| 5,606,447 A | 2/1997 | Asada et al. | |
| 5,629,790 A | 5/1997 | Neukermans et al. | |
| 5,767,666 A | 6/1998 | Asada et al. | |
| 5,828,051 A | 10/1998 | Goto | |
| 5,914,801 A | 6/1999 | Dhuler et al. | |
| 5,959,760 A | 9/1999 | Yamada et al. | |
| 5,969,465 A | 10/1999 | Neukermans et al. | |
| 6,069,727 A | 5/2000 | Cho et al. | |
| 6,075,639 A | 6/2000 | Kino et al. | |
| 6,122,090 A | 9/2000 | Kino et al. | |
| 6,714,336 B2 | 3/2004 | Orcutt et al. | |
| 6,758,571 B2 | 7/2004 | Heaton | |
| 6,794,794 B2 | 9/2004 | Klement | |
| 6,803,938 B2 | 10/2004 | Turner | |
| 6,812,669 B2 | 11/2004 | Hagen | |
| 6,838,661 B2 | 1/2005 | Klement | |
| 6,844,951 B2 | 1/2005 | Cannon et al. | |
| 7,095,156 B2 | 8/2006 | Yoda | |
| 7,271,943 B2 | 9/2007 | Yasuda et al. | |

*Primary Examiner*—James Phan (57) ABSTRACT

A scanning apparatus for a printer or similar instrument. A multiharmonic oscillator is used to provide a composite motion of a laser beam or other light beam to scan an imaging surface. The multiharmonic oscillator may have multiple sections each having a different resonant frequency. One section includes a reflector that intercepts the light beam, and drive electronics move the reflector so the light beam scans the imaging surface. Linear and complex non-linear motions of the light beam may be achieved. Microelectromechanical systems (MEMS) technology may be used to fabricate the oscillator.

15 Claims, 11 Drawing Sheets

MULTIHARMONIC GALVONOMETRIC SCANNING DEVICE

CROSS REFERENCE TO RELATED APPLICATION

Pursuant to 37 C.F.R. §1.78, this application is a divisional and claims the benefit of the earlier filing date of Application Ser. No. 11/176,056 filed Jul. 7, 2005, now U.S. Pat. No. 7,573,625, entitled "Multiharmonic Galvonometric Scanning Device."

FIELD

This invention relates to the field of oscillating scanning mechanisms. More particularly, this invention relates to scanning mechanisms used in electronic printers and similar devices.

BACKGROUND

Scanning mechanisms are used in electronic printers and similar devices. In printers the scanning mechanism typically deflects a light beam, often a laser light beam, from a light beam source onto an imaging surface. Generally one or more mirror surfaces are used to deflect the light beam from the light beam source to the imaging surface. Typically the mirror surface moves in a periodic pattern to deflect the light beam across the imaging surface in a scanning motion. Drive electronics are generally used to control the motion of the mirror surface. The imaging surface may be an electrophotographic drum, a photographic film, a display, or other surface. The imaging surface generally combines successive scans of the light beam in order to form a visual or an electronic image.

It is generally desirable to have the light beam scan the imaging surface with a beam moving as a linear function of time (i.e., a constant velocity). This is often difficult to achieve because (1) the natural motion of the mirror surface may be intrinsically non-linear, and/or (2) the distance from the source of the beam to the imaging surface may change (due to the geometry of the optics, or other factors) as the beam scans the imaging surface. Often one or more compensating lenses or reflectors are used to help achieve linearity in the scanning motion. In addition to achieving linearity of the scan, the compensating lenses or reflectors typically also focus the light beam to a small spot along the scan path on the imaging surface. If one could have the ability to shape the scan pattern independently from the compensating lens, the compensating lens design could favor other performance factors such as spot size or uniformity, which may otherwise be compromised by the need to also address linearity with the same elements. In summary, what is needed is an apparatus and method to control the motion of a light beam in a scanning apparatus that is substantially independent from elements that may be used for enhancing other features of the light beam.

SUMMARY

The present invention provides a scanning apparatus that includes a light beam. The apparatus also incorporates a multiharmonic oscillator that has a plurality of connected oscillating sections. Each oscillating section has a resonant frequency, and at least one oscillating section comprises a reflector positioned to intercept the light beam and reflect the light beam from the reflector as a scan pattern. The apparatus also includes drive electronics that are configured to move at least one oscillating section at substantially the at least one oscillating section's resonant frequency, thereby causing the light beam to scan as the light beam reflects from the reflector.

Another embodiment provides a scanning apparatus having a light beam and an imaging surface. This embodiment also provides a multiharmonic oscillator having a reflector positioned to intercept the light beam and reflect the light beam from the reflector to the imaging surface. Drive electronics are provided and configured to move the multiharmonic oscillator according to a mathematical series function, thereby causing the light beam to scan the imaging surface as the light beam reflects from the reflector.

A further embodiment provides a method of scanning an imaging surface. The method begins with providing a light beam, and providing a multiharmonic oscillator having a plurality of connected oscillating sections, where each oscillating section has a resonant frequency that corresponds to a different frequency peak of a frequency domain transform of a desired scanning motion. The method continues with providing a reflector on the multiharmonic oscillator and then intercepting the light beam with the reflector and reflecting the light beam from the reflector to an imaging surface. A further step is simultaneously driving each of a plurality of the oscillating sections at substantially the resonant frequency of each driven oscillating section, thereby causing the light beam reflecting from the reflector to scan an imaging surface with substantially the desired scanning motion.

BRIEF DESCRIPTION OF THE DRAWINGS

Further advantages of the invention may be apparent by reference to the detailed description in conjunction with the figures, wherein elements are hot to scale so as to more clearly show the details, wherein like reference numbers indicate like elements throughout the several views, and wherein.

DETAILED DESCRIPTION

Figure 1:
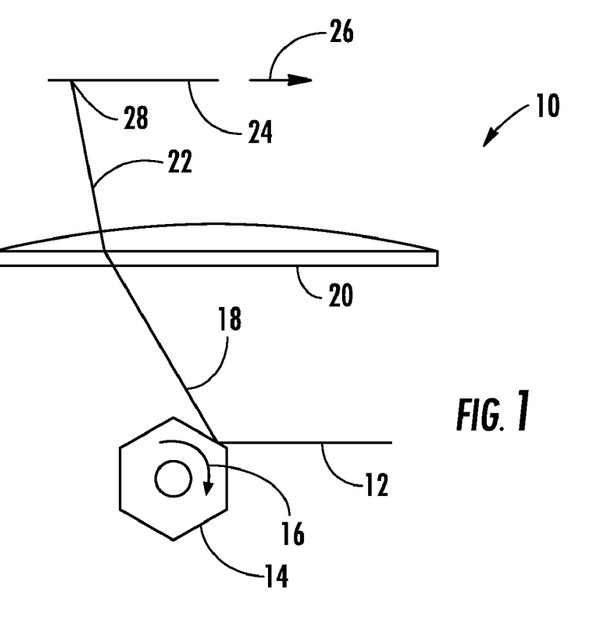
FIG. 1 is a plan view of a scanning mechanism according to the invention.

Many printers incorporate a scanning unit to move a beam of light in a raster pattern along the surface of an electrophotographic (EP) drum, while depositing light in appropriate positions on the drum surface as the beam is scanned. A primary purpose of the scanning unit is to move a focused light spot along a designed path, preferably with motion that is generally substantially linear in both space and in time. One apparatus for providing this linear motion is depicted in FIG. 1, where scanning system 10 comprises a rotating polygon mirror 14 coupled with an f-θ lens 20. In some embodiments f-θ lens 20 comprises a system of lenses. As the polygon mirror 14 rotates, incident light beam 12 is deflected through a range of scan angles as reflected light beam 18, and the f-θ lens 20, in cooperation with the polygon mirror 14, focuses reflected light beam 18 as scan ray 22 onto a series of positions (e.g., focused spot 28) along imaging surface 24. Because of the single rotation direction 16 of polygon mirror 14, scan ray 22 moves only in direction 26 across imaging surface 24. In the most preferred embodiments incident light beam 12 is a laser light beam.

Figure 2:
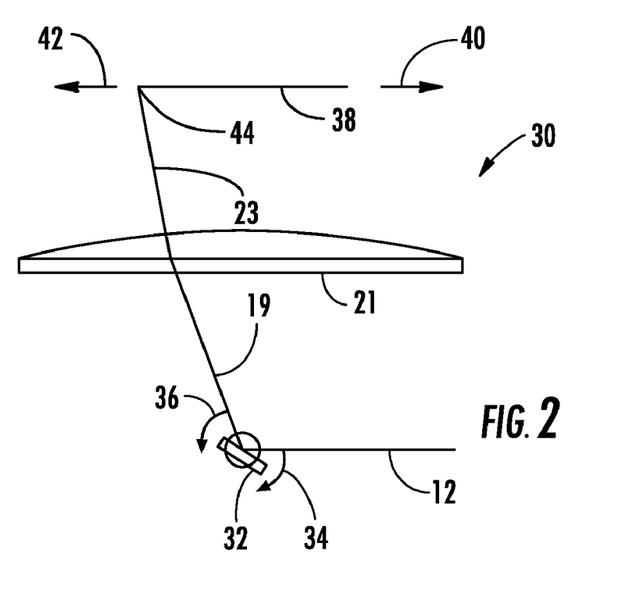
FIG. 2 is a plan view of an alternate scanning mechanism according to the invention.

Another apparatus for scanning a light beam uses a galvanometric (galvo) mechanism, as illustrated by scanning system 30 depicted in FIG. 2. In this embodiment, a small oscillating mirror 32 repetitively oscillates about a rotational axis to deflect the incident beam 12 as reflected light beam 19 through transform lens 21 as scan ray 23 onto a series of positions (e.g., focused spot 44) on electrophotographic (EP) drum 38. Because oscillating mirror 32 moves in two directions (34 and 36), scan ray 22 also moves in two directions (40 and 42) across EP drum 38. System 30 uses transform lens 21 (different optically from f-θ lens 20) to transfer the time-varying motion of reflected beam 19 into scan ray 23 that moves focused spot 44 as a linear function of time (i.e., at a constant velocity) across the EP drum 38. Note that the term "constant velocity" refers to speed, irrespective of direction.

There are several other means by which the motion of an oscillating mirror may be linearized. For example, the system may be designed so that the excursion of the scanned spot is significantly greater than the width of the EP drum. Thus, only the central portion of the sinusoid, which more closely approximates a linear sweep, is used for writing. There are two primary disadvantages of the extended sweep method. First, the efficiency of the system is very low, since a large portion of the available scan is unused, and maximum printing speed is consequently reduced. Second, the system must be made larger so that the travel of the scanned spot exceeds the width of the EP drum.

Figure 3:
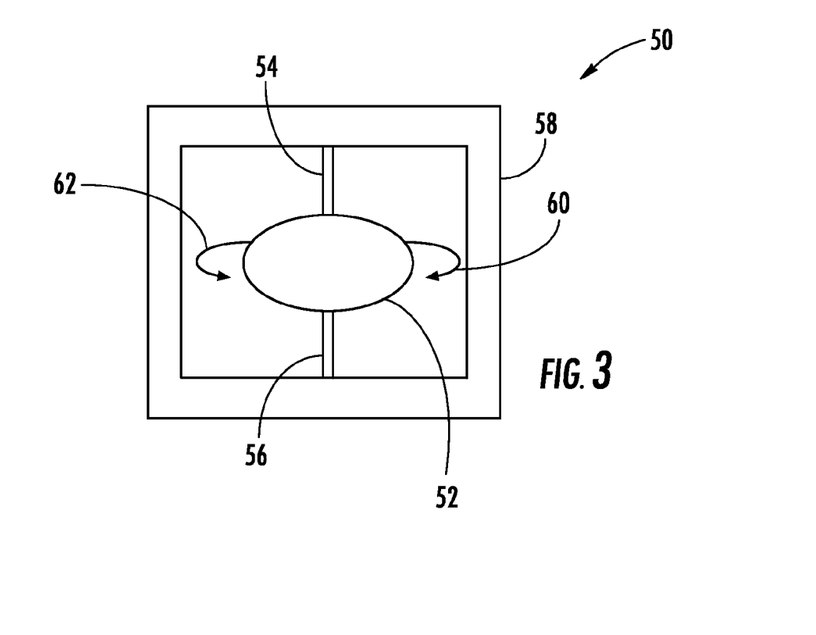
FIG. 3 is a front elevation view of an oscillator according to the invention.

Recent advances in microelectromechanical systems (MEMS) technology have made practical the manufacture of small mechanical assemblies via semiconductor processing of silicon. Applying MEMS technology to the present invention provides several advantages, including potentially much lower cost and greater reliability than equivalent rotating polygon systems or traditional mechanical galvo assemblies. A galvanometric (galvo) MEMS scanning mechanism 50 is shown schematically in FIG. 3. A mirror 52 is connected to thin ribbons 54, 56, which hold the mirror 52 in a stationary frame 58. The mirror 52 may be actuated (moved or driven) by any of a number of means, including electromagnetic, electrostatic, thermal, piezoelectric, and others, regardless of the specific drive mechanism. For simplicity of reference these systems are referred to as galvanometric or "galvo" systems. Once actuated, the mirror 52 oscillates in directions 60 and 62 around an axis through ribbons 54 and 56, typically at the resonant frequency of the system. The resonant frequency is determined by factors such as geometry and composition of ribbons 54, 56 and the mirror 52. If the actuating force is applied periodically at the resonant frequency, the mirror motion is stable and repeatable, and mirror deflection is maximized.

Figure 4A:
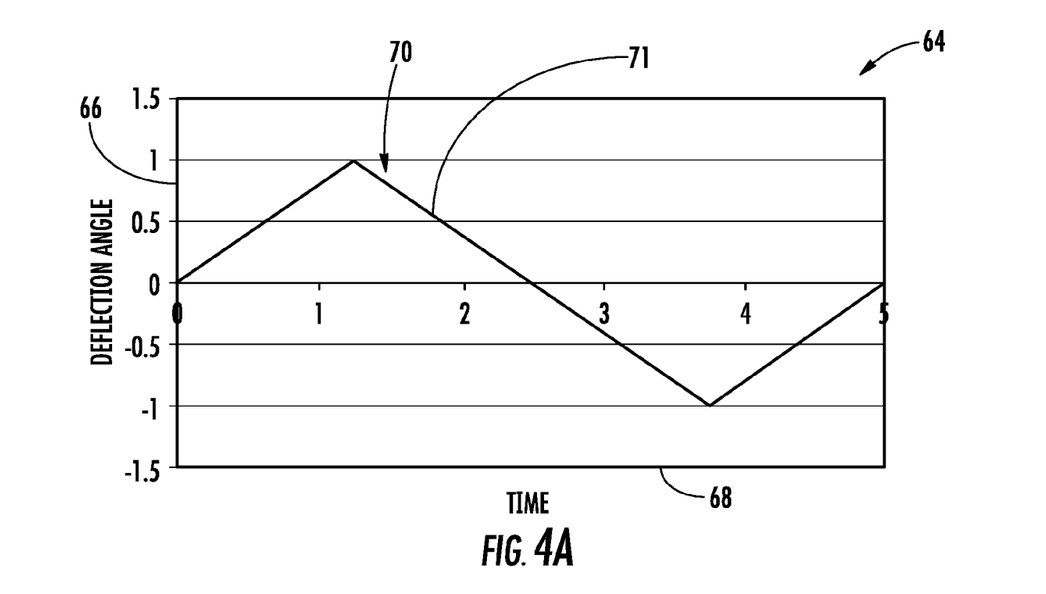
FIG. 4A shows an ideal scan motion for bidirectional printing using an f-θ lens or lens system to convert the angular sweep of the scanning mechanism to a purely linear motion along an imaging surface, according to the invention.

Without any scan shaping means, the natural angular deflection of the galvo mirror 52 in galvo scanner system 50 is a sinusoidal function of time. This deflection characteristic may not be ideal for the particular performance goals that the system designer is attempting to achieve, and therefore may present a disadvantage to the system designer. For example, if the goal of the designer is to replace the conventional polygon mirror scanner system 10, the ideal scan profile is a sawtooth wave such as sawtooth wave 156 shown in FIG. 7, in which the deflection angle 152 is a linear function of time 154 with a rapid return at the end of the scan. If bi-directional printing is desired, a triangle wave profile, such as triangular wave form 70 shown in FIG. 4A is ideal. If, instead, the goal of the designer is to eliminate the f-θ lens from the system, the scan profile depicted as waveform 168 of FIG. 8 would be ideal for producing a linear scan along the imaging surface. If the designer wishes to use a lens between the scanner and the imaging surface to achieve maximum uniformity of spot size along the scan path, the ideal scan profile is a different function of time that depends upon the shape of the focusing lens. In fact, the ideal scan profile could be any arbitrary function of time, depending upon the precise design configuration of the remaining portion of the system. With current devices, the inability to achieve an ideal profile places constraints on the design of the remaining portion of the system, and therefore generally causes system performance to be compromised.

In a most preferred configuration, a galvo or other oscillating scan mechanism repetitively sweeps with a profile relating deflection angle to time that is determined by the design of the remainder of the scanning system, such that the scanned spot moves along a scan path on the imaging surface in a manner that is substantially linear as a function of time. FIG. 4A provides a plot 64 of deflection angle 66 over time 68 for a triangular wave form 70, which is ideal for bidirectional printing. Segment 71 of the periodic function defined by triangular wave form 70 is an example of a segment of a periodic function having a substantially uniform angular rate of motion. The most preferred embodiments of the present invention provide a class of galvanometric scanner designs that produce approximately linear motion over a wide range of scan angle, approximating this preferred triangle wave motion.

Figure 4B:
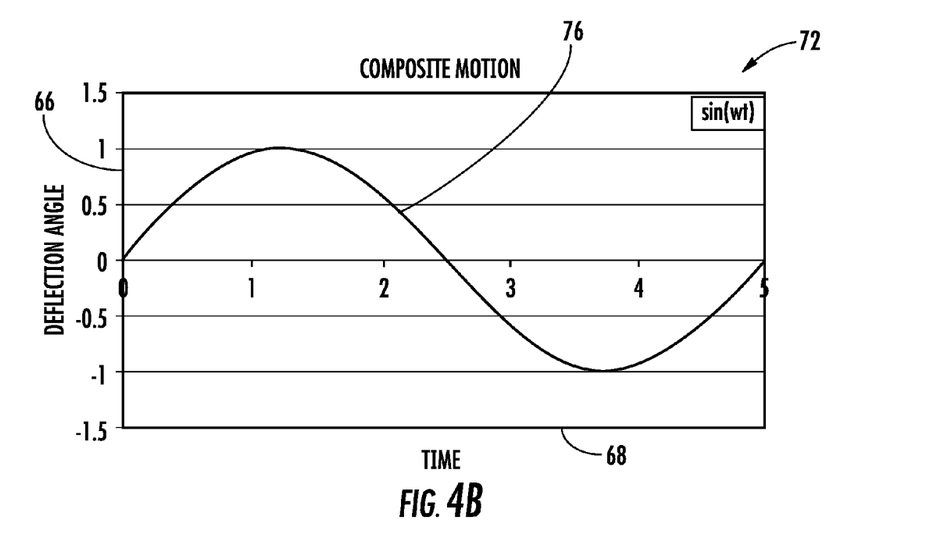
FIGS. 4B-4E are graphs of the composite motion of a light beam according to the invention.
Figure 4C:
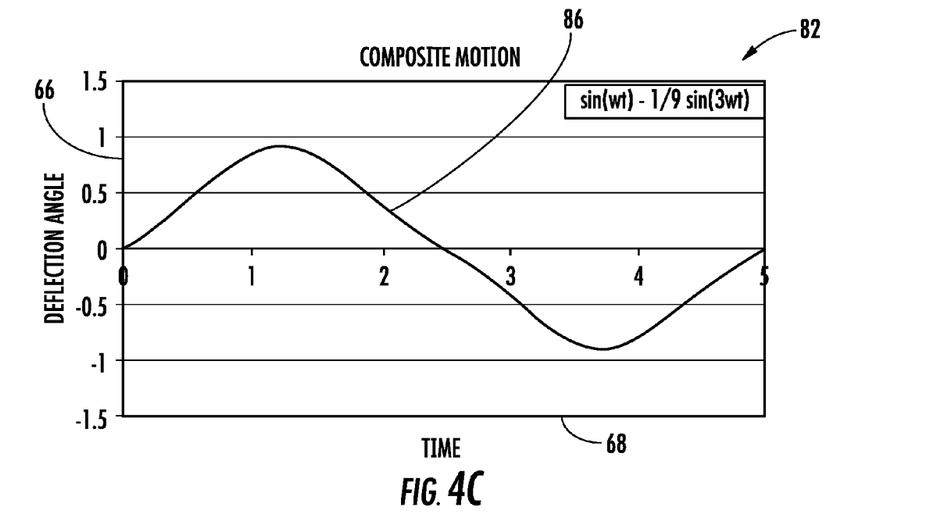
Figure 4D:
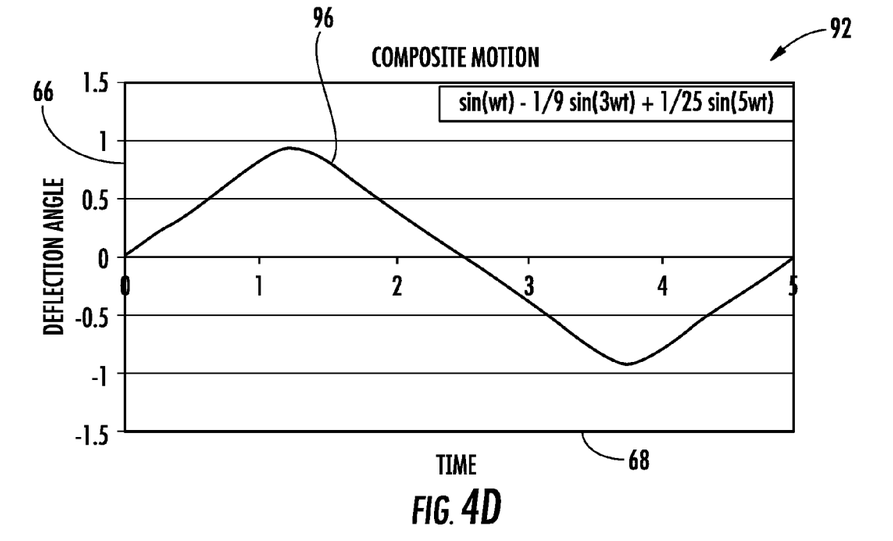
Figure 4E:
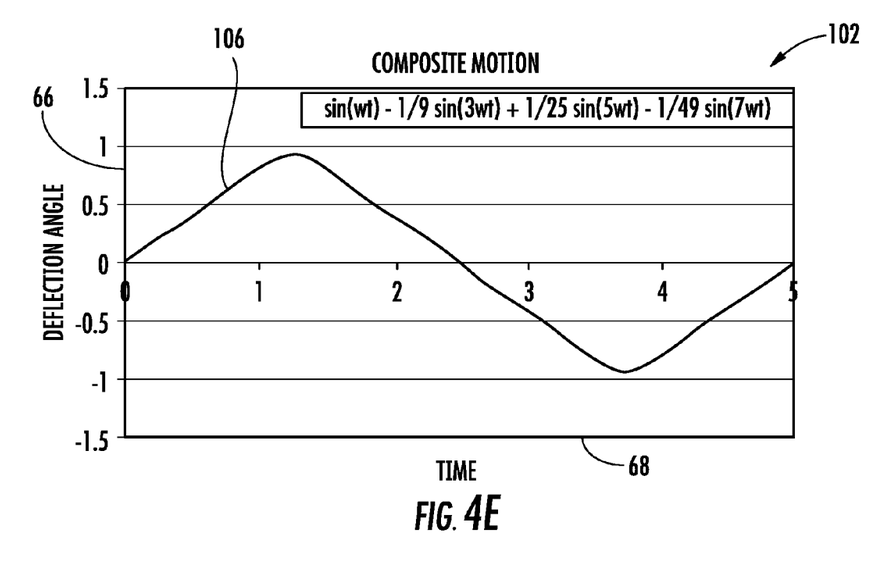

A mathematical theory, generally attributed to Fourier, states that a periodic function may be considered to be a superposition of harmonic sinusoids, each with unique amplitude and phase parameters. Applying this theory to the example of a triangle wave function yields the relationship of EQN 1:

$$T(\omega, t) = \sum_{n=1}^{\infty} \frac{(-1)^{n-1}}{(2n-1)^2} \sin[(2n-1)\omega t] \quad \text{EQN 1}$$

$$= \sin(\omega t) - \frac{1}{9}\sin(3\omega t) + \frac{1}{25}\sin(5\omega t) - \ldots$$

where T(ω, t) is a triangle wave as a function of time t, with radian frequency ω. Each harmonic of this infinite series contributes a progressively diminishing amount with increasing order. The sequence of graphs in FIGS. 4A-4D shows the effect of adding higher order harmonics. FIG. 4B presents a plot 72 showing amplitude 66 over time 68 of waveform 76 that is attributable only to the fundamental sin(ωt) term. FIG. 4C presents a plot 82 of motion 86 that results from adding the first higher-order term, 1/9 sin(3 ωt). FIG. 4D illustrates a plot 92 of motion 96 that results from adding the second higher-order term, 1/25 sin(5 ωt), and FIG. 4E illustrates a plot 102 of motion 106 that results from adding the third higher-order term, 1/49 sin(7 ωt). It is clear that even with only one or two higher-order terms, the waveform becomes substantially linear over a much wider portion of the waveform. The fundamental term and the higher-order terms are referred to as elements of a mathematical series function.

The most preferred embodiments provide a galvo mechanism for which oscillating sections of the device resonate at specific fundamental and harmonic frequencies. Each oscillating section's resonant frequency is a function of its geometry and material composition as well as the structure through which it is connected into the mechanism. Typically there is one oscillating section for each mathematical series element that is selected to describe the desired motion. At least one section of the device, the "reflector," is preferably situated such that its total motion is described by the sum of the motions of all resonant sections and the sum of the motions corresponds to the summation of at least two mathematical series elements describing the desired motion. The reflector is typically a mirrored surface. In some embodiments the oscillating section comprising the mirrored surface is fabricated from a mirror material. In some embodiments the oscillating section comprising the mirrored surface is fabricated by bonding or forming a mirror material onto a substrate. Furthermore, each section is designed so that its resonant frequency, natural amplitude, and relative phase of vibration is appropriate in combination with the other sections in order to create the desired total motion of the reflector.

Figure 5A:
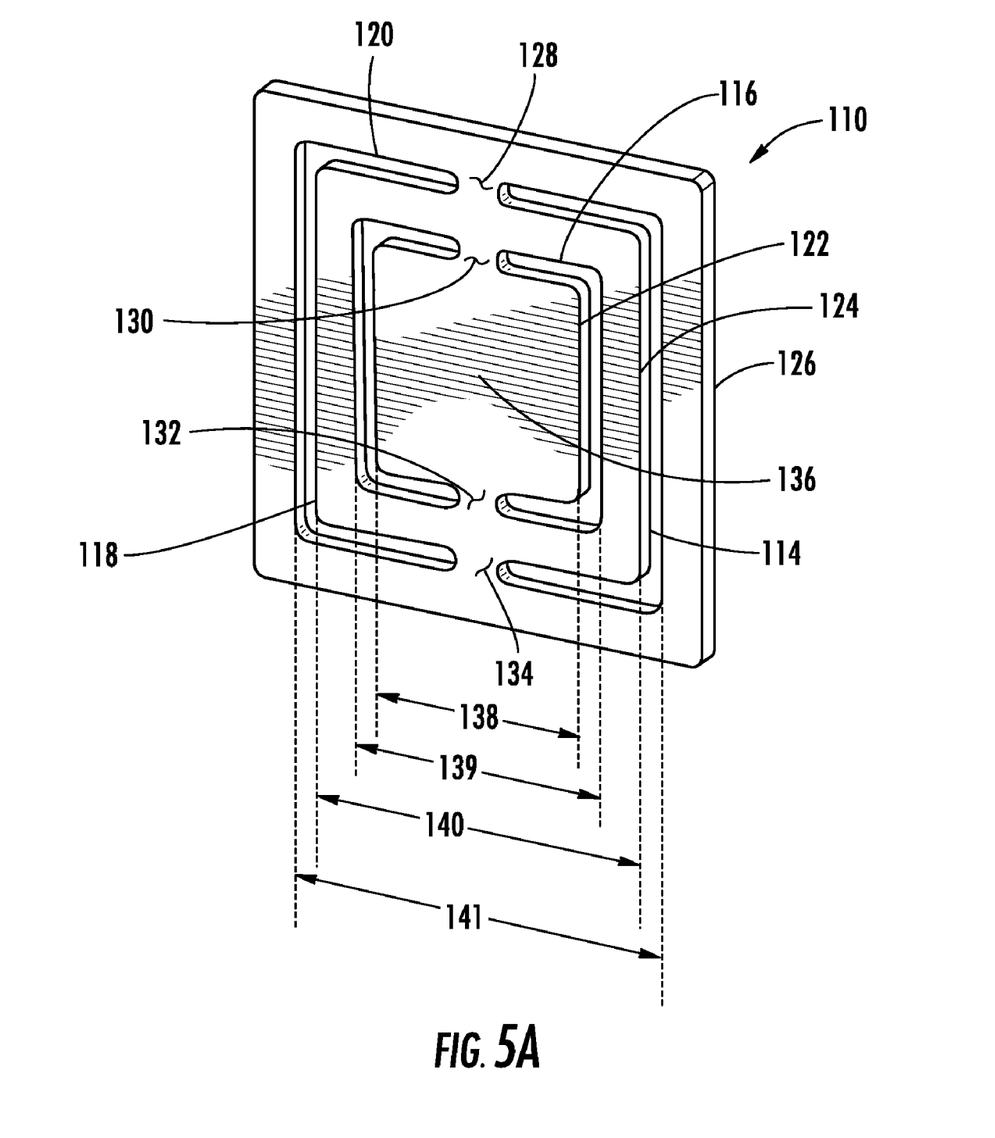
FIG. 5A is a front elevation perspective view of an oscillator at its neutral position, according to the invention.
Figure 5B:
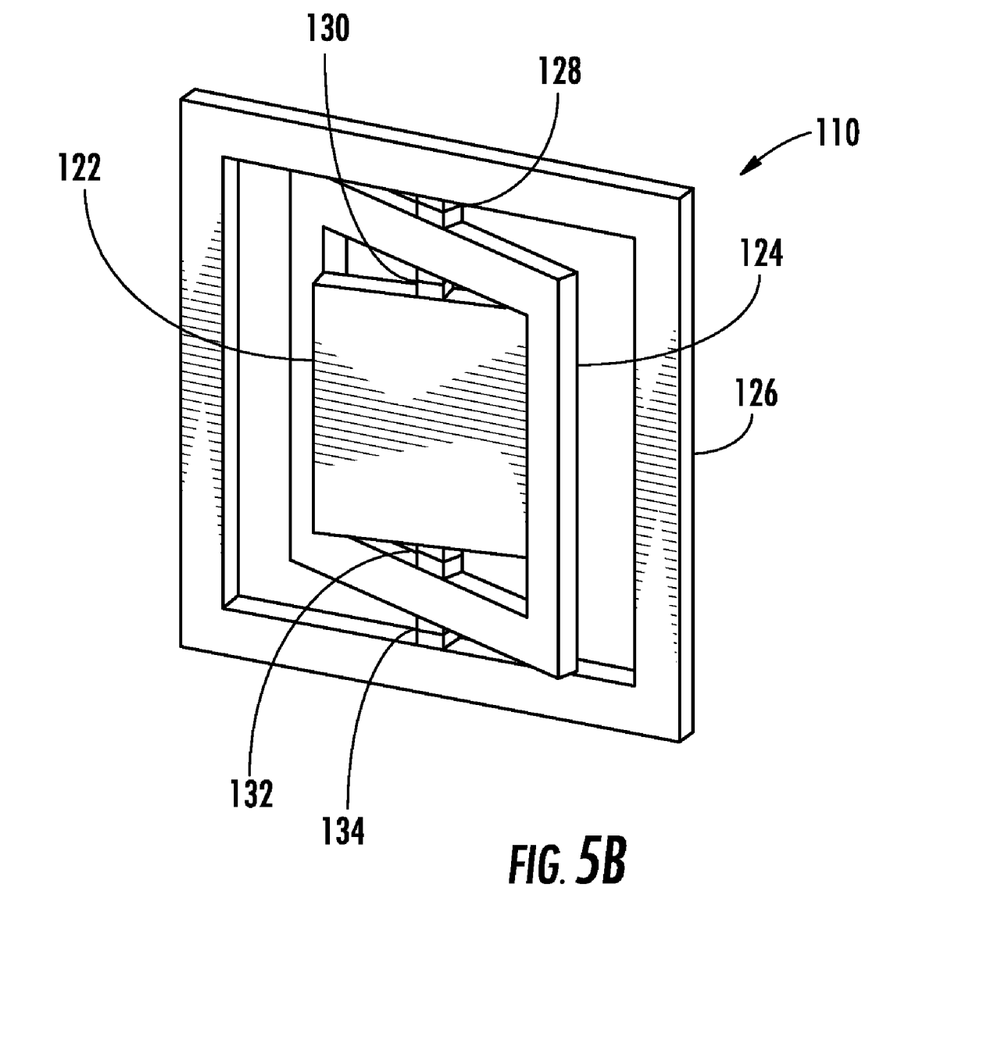
FIG. 5B is a front elevation perspective view of the oscillator of FIG. 5A at a driven position, according to the invention.

As previously indicated, for laser printing one possible desired total motion, assuming the goal of the designer is to replace a rotating polygon mirror scanner, is a triangle wave relating angular excursion to time. A schematic illustration showing an example of such a galvo mechanism is provided in FIGS. 5A and 5B. FIG. 5A shows multiharmonic scanning mechanism 110 as constructed and at rest. FIG. 5B shows a dynamic representation of multiharmonic scanning mechanism 110 at one point in an oscillation cycle. FIG. 5B is diagrammatic and not to scale, and the positions of the elements are artificially contrived to illustrate relative motion. Multiharmonic scanning mechanism 110 is comprised of three sections—a central square reflector 122, a middle resonant frame 124 and an outer mounting frame 126—all connected with narrow coaxial links 128, 130, 132, and 134. The central square reflector 122 and the middle resonant frame 124 are oscillating sections; outer mounting frame 126 is stationary. The motion of the reflector 122 relative to the outer frame 126 is a sum of the motion of the middle frame 124 relative to the outer frame 126 and the motion of the reflector 122 relative to the middle frame 124. Provided that the reflector 122 oscillates at approximately three times the frequency of the middle frame 124, 180° out of phase and with one ninth the amplitude (as implied by EQN 1), multiharmonic scanning mechanism 110 will provide the approximately triangular wave motion of the reflector 122 described by two terms of a sinusoidal series (i.e., waveform 86 in FIG. 4C).

In describing the geometry of multiharmonic scanning mechanism 110, central square reflector 122, middle resonant frame 124, and outer mounting frame 126 are described as concentric because they have a common center 136. Outer mounting frame 126 is "outside" middle resonant frame 124 because inner width 141 of outer mounting frame 126 is larger than outer width 141 of middle resonant frame 124. Similarly, middle resonant frame 124 is "outside" center square reflector 122 because inner width 139 of middle resonant frame is larger than outer width 138 of center square reflector 122. Multiharmonic scanning mechanism 110 is an example of a geometry that illustrates scanning members interacting to sum (add) several motion components and create a composite motion. Other multiharmonic capable geometries include mechanisms where sections are elliptical rather than square or rectangular, and geometries where the sections are formed from several "arms" rather than full frames.

A multiharmonic scanning device that is capable of a constant angular scanning velocity across a large portion of its scan angle provides significant advantages. First, it makes the scanner more compatible as a replacement for a polygon mirror scanner. Second, enlarging the scan angle compared to a sinusoidal motion scanner reduces the system size for a given scan line length. Third, a larger portion of the mirror scan angle may be used to create the image (increased scan efficiency), thus improving the laser pulse time that is a limitation at higher print speeds.

Figure 6:
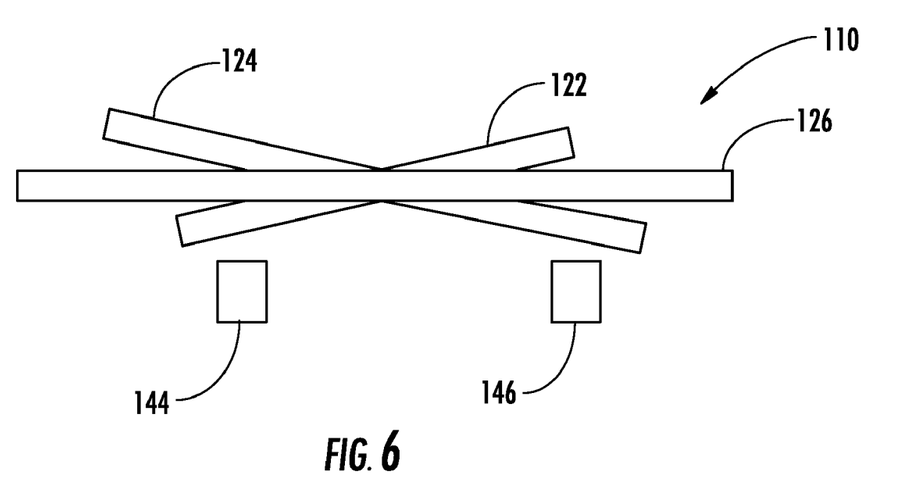
FIG. 6 is a top view of the oscillator of FIG. 5B, together with drive electronics, according to the invention.

In the most preferred embodiments, multiharmonic scanning mechanism 110 is actuated by any of the means previously described for a galvo mechanism, (i.e., electromagnetic, electrostatic, thermal, piezoelectric, etc.). For example, FIG. 6 illustrates drive electronics comprising two drive units 144 and 146 that actuate motion in reflector 122 and middle frame 124 respectively. In some embodiments only one drive unit (144 or 146) is used, with the resulting motion being defined by the dynamic interactions of the connected sections. When only one drive unit is used, it is still considered to be simultaneously driving each oscillation section (i.e., driving both reflector 122 and middle frame 124 in this embodiment) since the drive unit initiates motion in every oscillation section. If multiple drive units are used operating at different frequencies, relative phases, duty cycles, wave shapes or other drive parameters, they are they are considered to be simultaneously driving each oscillation section. The frequency at which actuation forces are applied is preferably the fundamental frequency of the desired waveform, although the mechanism works at least as well if the actuation signal is applied at one of the harmonic frequencies. The error between the desired motion and the actual motion may be minimized by applying an actuation signal that describes a more complex function in time.

Figure 7:
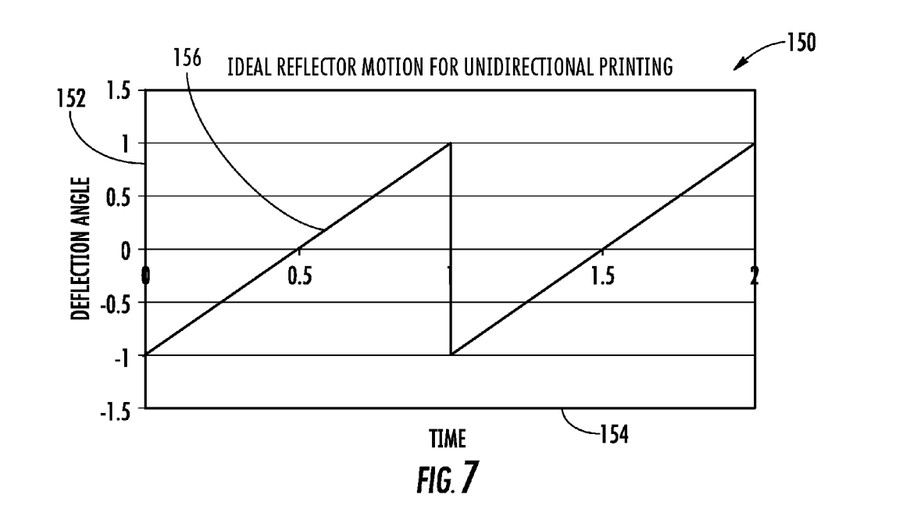
FIG. 7 is a sawtooth deflection pattern of a unidirectional scanning mechanism, according to the invention.

Different waveforms may be preferred for different design goals and requirements. The previously-described triangular waveform is preferred when the laser beam is used to write information to an EP drum using bi-directional beam travel as may be found in a system traditionally incorporating a rotating polygon mirror scanner. However, a different wave form is preferred for uni-directional printing. FIG. 7 depicts plot 150 showing deflection angle 152 over time 154 for a sawtooth wave 156. Sawtooth wave 156 is preferred for the same system, but for which a light beam writes information only in one direction. Since any periodic motion of the reflector may be described as a sum of harmonic components, the multiharmonic design may also be applied to sawtooth wave 156.

Figure 8:
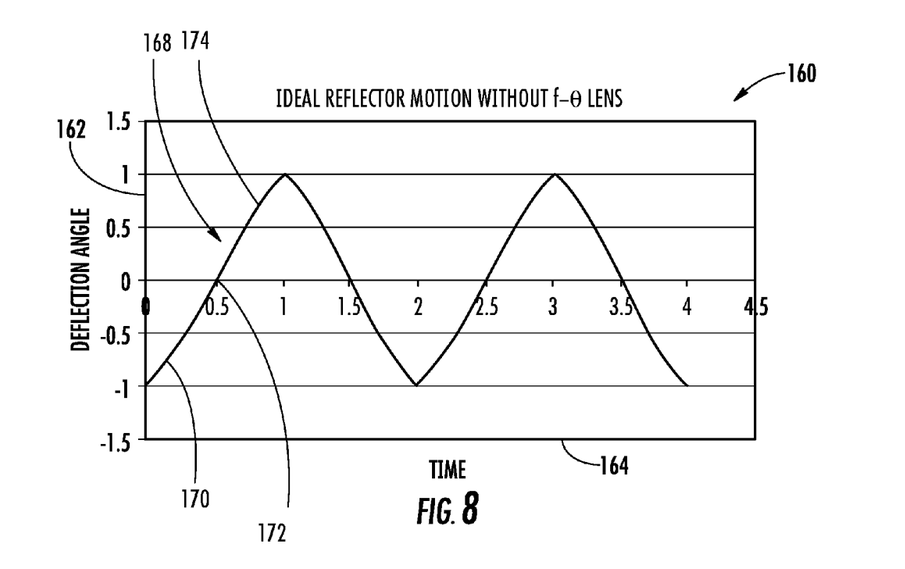
FIG. 8 is a deflection pattern of a scanning mechanism optimized to create a uniform linear scanning rate on an imaging surface without substantial further compensation, according to the invention.

In another embodiment, a galvanometric scanner element may be designed to provide a preferred nonlinear motion, as illustrated by the following example. The purpose of the f-θ lens in a traditional printer is to transform the constant angular velocity beam rotation produced by the scanning mechanism (e.g., rotating polygon 14 in FIG. 1) into a constant linear velocity travel of the beam on the surface of an imaging surface (e.g., imaging surface 24 in FIG. 1, or EP drum 38 in FIG. 2). However, the f-θ lens may be eliminated by causing the scanning mechanism to rotate the beam in such a to way that the velocity of the spot (e.g., focused spot 28 in FIG. 1, or focused spot 44 in FIG. 2) that is formed on the imaging surface or drum intrinsically moves at constant linear velocity along the surface of the imaging surface or drum. The terms "intrinsically moves" and "intrinsically scans" refer to a motion of a beam that does not require further spatial/time correction to achieve the desired motion. Elimination of this lens results in reduced cost and complexity of the print head and associated manufacturing processes. A mathematical formula may be developed to define a uniform linear motion of a scan ray spot on an imaging surface where the beam is reflected to the imaging surface from a galvo oscillator without correction by an f-θ lens. Specifically, when the beam is incident on the axis of rotation of a galvo mechanism that deflects the beam onto the imaging surface along a straight line normal to the beam at its center position, a constant linear spot velocity at the drum will result if the normalized angular motion of the mechanism has the functional form of EQN 2:

$$\Phi(t) = \frac{1}{\Phi_{max}} \tan^{-1}\left(\frac{v(t - t_c)}{d}\right) \qquad \text{EQN 2}$$

where $\Phi(t)$ is normalized instantaneous angle of the mechanism as a function of time t, with a total scan range of $\pm\Phi_{max}$, $t_c$ is the time at which the beam passes through the central point of the scan, v is the linear velocity of the spot on the drum surface, and d is the minimum distance between the rotation axis of the galvo and the EP drum. FIG. 8 shows an example of the resulting waveform for one set of parameters. Plot 160 shows deflection angle 162 over time 164 for a waveform 168. When the absolute value of deflection angle 162 is comparatively large, such as in regions 170 and 174, the rate of change of angular deflection 162 over time 164 is relatively small. When the absolute value of the deflection angle 162 is comparatively small, such as in region 172, the rate of change of angular deflection 162 over time 164 is larger. That is, the rate of change (d[angle]/dt) is smaller at the ends, where the curve is flatter. As a result of these variations, segment 176 of the periodic function defined by waveform 168 is an example of a segment of a periodic function having a substantially non-uniform angular rate of motion.

Figure 9:
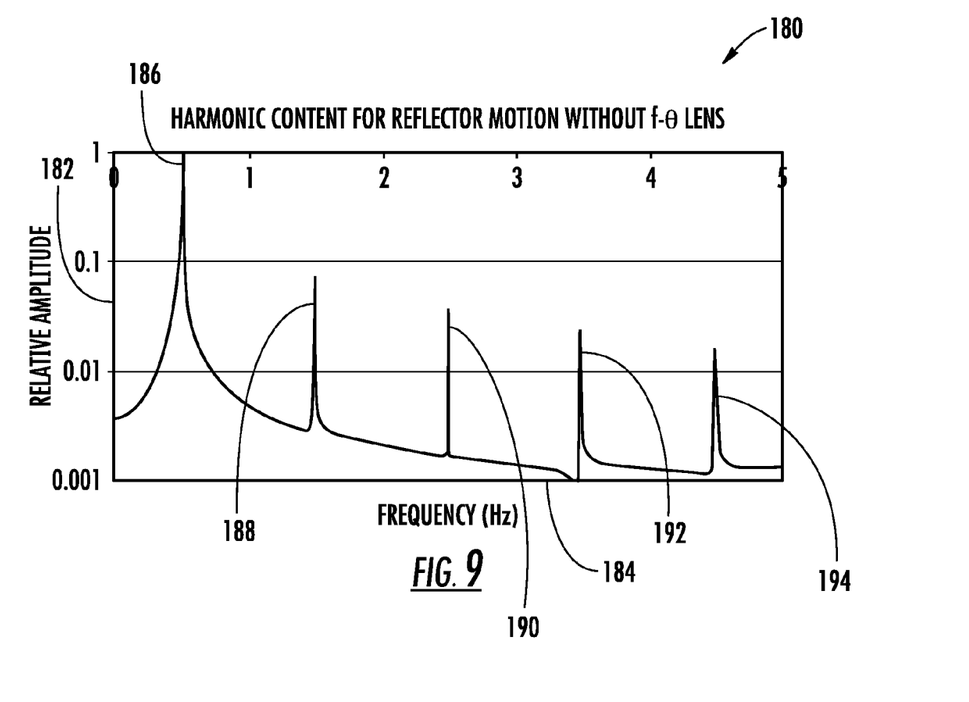
FIG. 9 is a Fourier analysis of the deflection pattern of FIG. 8, according to the invention.

The relative amplitudes and phases of the harmonic frequencies that comprise a nonlinear motion may be determined by examining a Fourier transform of the desired time domain signal. For example, FIG. 9 shows the magnitude of the Fourier transform of the waveform depicted in FIG. 8. Plot 180 depicts the relative amplitude 182 of different frequencies 184 that comprise the harmonic content of waveform 168. Frequency peaks 186, 188, 190, 192, and 194 represent the principal harmonic components according to the Fourier transform. In practice the frequency peaks 186, 188, 190, 192 and 194 may be derived from a classic integral Fourier transform, or from a discrete Fourier transform (such as a Fast Fourier Transform), or from any similar mathematical time/frequency inversion process, collectively referred to herein as "frequency domain transforms." A multiharmonic oscillator comprising several connected sections may be constructed where each section has a resonant frequency corresponding to one of the peaks 186, 188, 190, 192 and 194. When each section moves at its resonant frequency with appropriate amplitude and phase relative to the motion of each of the other sections, and the multiharmonic oscillator is designed with a reflector having motion defined by the sum of the motions of the sections, the waveform of a light beam reflected from that reflector will approximate waveform 168 in FIG. 8. Other forms of nonlinear motion may be advantageous to achieve different design or performance goals. The total motion of a reflector may be tailored to achieve such other nonlinear motions by selecting the number of included harmonics and corresponding harmonic frequencies, amplitudes and phases that is sufficient to adequately approximate the desired motion.

Figure 10:
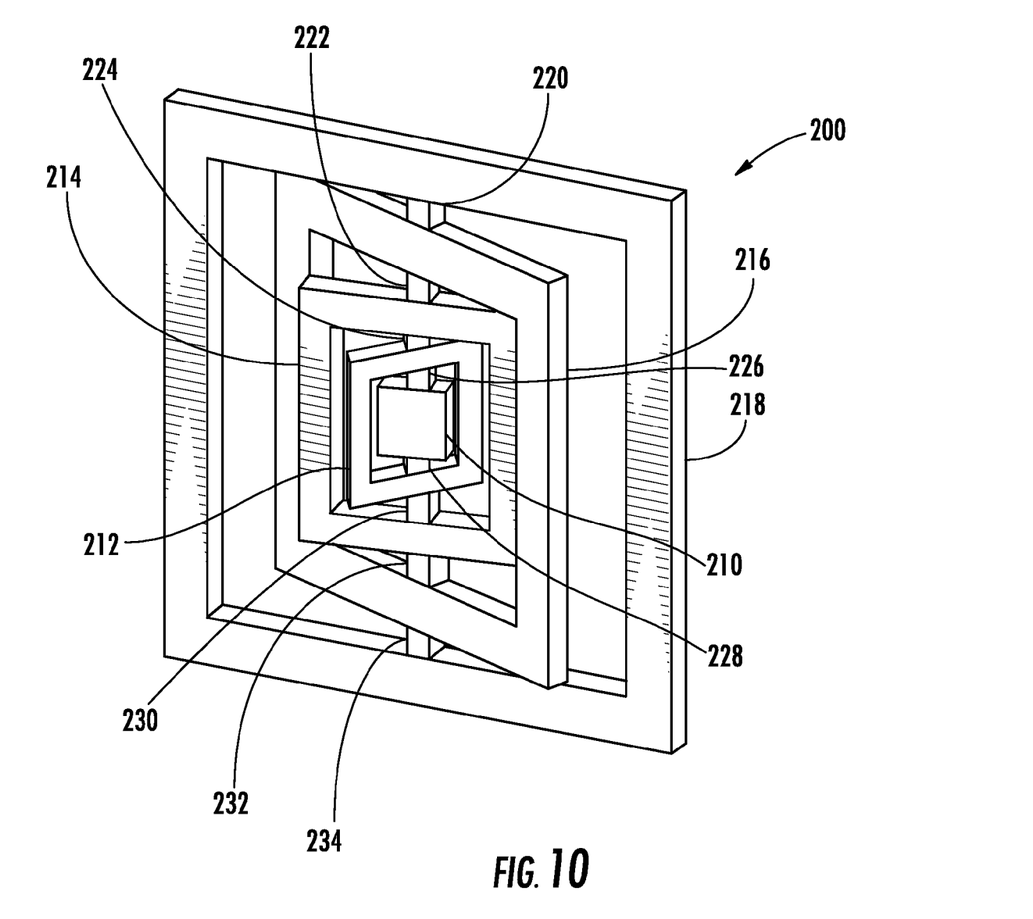
FIG. 10 is a front elevation perspective view of a multiharmonic scanning device at a driven position, according to the invention.
Figure 11:
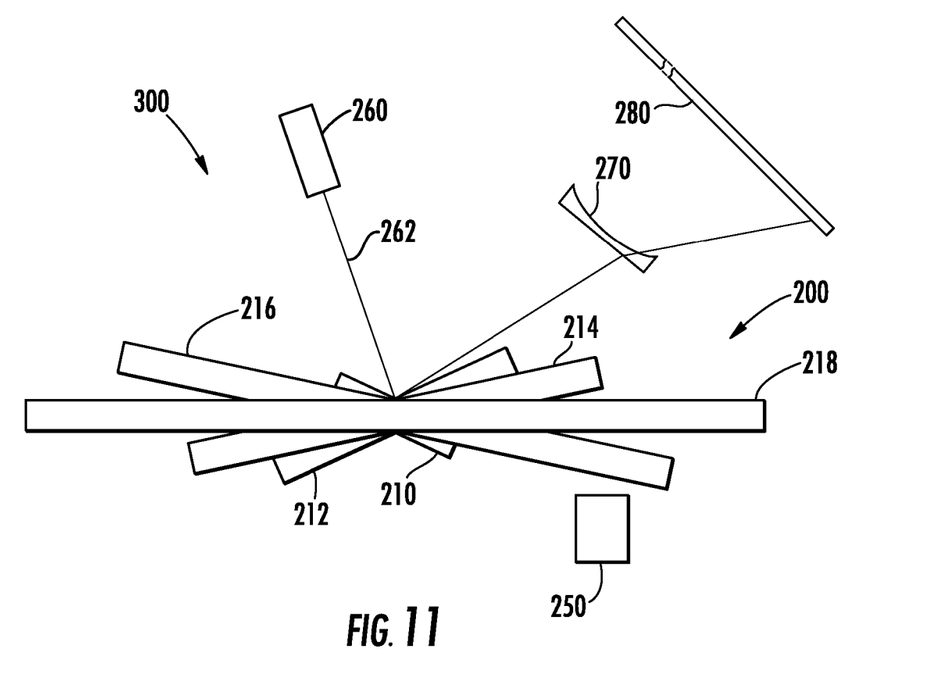
FIG. 11 is a top view of the oscillator of FIG. 10, together with drive electronics and a scanning mirror, according to the invention.

A multiharmonic scanning device may comprise more than two connected oscillating sections. For example, FIG. 10 depicts a multiharmonic scanning device 200 that comprises four oscillating sections 210, 212, 214, and 216, and a frame 218. FIG. 10 is diagrammatic and not to scale, and the positions of the elements are artificially contrived to illustrate relative motion. Oscillating mirror section 210 is connected by links 226 and 228 to oscillating frame section 212. Oscillating frame section 212 is connected by links 224 and 230 to oscillating frame section 214. Oscillating frame section 214 is connected by links 222 and 232 to oscillating frame section 216. Oscillating frame section 216 is connected by links 220 and 234 to stationary frame section 218. FIG. 11 depicts an embodiment of a scanning apparatus 300 employing multiharmonic scanning device 200. FIG. 11 is diagrammatic and not to scale, and the positions of the elements are artificially contrived to illustrate relative motion. A light beam source 260 emits a light beam 262 which is reflected from mirror section 210 to imaging surface 280. A single drive unit 250 is used to control the motion of multiharmonic scanning device 200. In this embodiment, scanning apparatus 300 employs a scanning lens 270. Scanning lens 270 may be used to assist in establishing a more linear scan light beam across imaging surface 280, to focus light beam 262 onto imaging surface 280, and to form the light beam spot into a uniform desired shape.

In configurations where a multiharmonic scanning device is employed in conjunction with a scanning lens, the multiharmonic mirror scanning mechanism is specifically designed to provide constant linearity after the effects of the scanning lens are taken into consideration. This provides the advantage of enlarging the scan angle compared to a sinusoidal motion scanner, thus reducing the system size for a given scan line length. Also a larger portion of the mirror scan angle may be used to create the image (increased scan efficiency), thus increasing the minimum laser pulse duration, thereby avoiding system limitations at higher print speeds. For example in a printer the print speed is determined by the frequency with which the light beam scans back and forth. Each scan is a single line of pixels on the page. As the beam sweeps across a line, the beam is turned on and off rapidly to write each of the pixels across the line. Ideally, the printer would be able to write pixels during the entire sweep of the beam across the page, i.e., the beam would sweep from the very left edge to the very right edge, and no more. However, in most applications this is not practical because of a need to sweep beyond the page to accommodate multiple page sizes, to provide a signal for beam sensors, etc. Any time that the beam spends off the page, though, is not available for writing pixels. The portion of one scan that is available for writing is known as scan efficiency. With reduced scan efficiency, the printer has to write the same number of pixels in a shorter amount of time, and therefore the speed at which the printer must be able to turn the light beam on and off increases. Consequently, it becomes increasingly more difficult and expensive to design and manufacture the system to provide the necessary light beam modulation speeds. This issue is further exacerbated in a galvo scanner where the light beam may scan far beyond the edges of the page to ensure that the portion of the sweep that falls on the page is on a sufficiently linear portion of the scan.

Another issue is that a scan lens system normally is designed to produce light beam spot sizes of a preferred size as well as a constant pitch in the placement of these spots on an image plane (linearity). A multiharmonic scanning device may eliminate the constraint of constant pitch (linearity) in the scanning lens. Thus the lens system is simplified, making the lens system lens expensive for comparable spot size performance.

The foregoing descriptions of embodiments of this invention have been presented for purposes of illustration and exposition. They are not intended to be exhaustive or to limit the invention to the precise forms disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A scanning apparatus comprising:
   a light beam;
   a multiharmonic oscillator comprising a plurality of connected oscillating sections that resonate at distinct fundamental and harmonic frequencies of each other, including a reflector positioned to intercept the light beam and reflect the light beam from the reflector to an imaging surface; and
   drive electronics configured to move the multiharmonic oscillator according to a predetermined mathematical series function, thereby causing the light beam to scan the imaging surface as the light beam reflects from the reflector, the mathematical series function including a series of elements, each oscillating section of the multiharmonic oscillator being driven based upon a distinct element of the mathematical series function, the oscillating sections and the drive electronics being configured to move the reflector in a motion that approximates a waveform having a substantially non-uniform angular rate of motion corresponding to a summation of the distinct elements of the mathematical series function.

2. The scanning apparatus of claim 1 wherein the mathematical series function causes the light beam to intrinsically scan the imaging surface at a substantially constant velocity.

3. The scanning apparatus of claim 1 wherein the mathematical series function causes the light beam to scan the imaging surface in a bidirectional pattern.

4. The scanning apparatus of claim 1 wherein the mathematical series function causes the light beam to scan the imaging surface in a unidirectional pattern.

5. The scanning apparatus of claim 1 wherein the mathematical series function comprises a summation of at least three series elements.

6. The scanning apparatus of claim 1 further comprising a scanning lens disposed to intercept the light beam after it reflects from the reflector.

7. The scanning apparatus of claim 1, wherein a normalized angular motion of the reflector approximates the functional form of:

$$\Phi(t) = \frac{1}{\Phi_{max}} \tan^{-1}\left(\frac{v(t-t_c)}{d}\right)$$

where $\Phi(t)$ is a normalized instantaneous angle of the reflector as a function of time t, with a total scan range of $\pm\Phi_{max}$, $t_c$ is a time at which the light beam passes through a central point of the scan, v is a linear velocity of the light beam on the imaging surface, and d is a minimum distance between an axis of rotation of the reflector and the imaging surface.

8. The scanning apparatus of claim 1, wherein the drive electronics comprise a plurality of drive units each configured to separately drive at least one of the plurality of oscillating sections.

9. The scanning apparatus of claim 1, wherein the drive electronics comprise a plurality of drive units each configured to separately drive at least one of the plurality of oscillating sections at the resonant frequency thereof.

10. The scanning apparatus of claim 1, wherein the mathematical series function comprises a Fourier series.

11. The apparatus of claim 1, wherein the predetermined mathematical series function comprises a Fourier series.

12. A method of producing a scanning light beam, the method comprising:
   generating a light beam;
   providing a multiharmonic oscillator having a reflector and a plurality of connected oscillating sections, each oscillating section having a resonant frequency, the resonant frequencies of the oscillating sections being at fundamental and harmonic frequencies of each other;
   intercepting the light beam with the reflector; and
   simultaneously and separately driving each of the oscillating sections at substantially the resonant frequency thereof, each oscillating section being driven according to a distinct series element of a predetermined mathematical series function, wherein the light beam reflects from the reflector in a motion that approximates a deflection waveform having a substantially non-uniform angular rate of motion corresponding to a summation of the distinct series elements of the mathematical series function.

13. The method of claim 12, wherein the reflector deflects the light beam onto an imaging surface and a normalized angular motion of the reflector approximates the functional form of:

$$\Phi(t) = \frac{1}{\Phi_{max}} \tan^{-1}\left(\frac{v(t-t_c)}{d}\right)$$

where $\Phi(t)$ is a normalized instantaneous angle of the reflector as a function of time t, with a total scan range of $\pm\Phi_{max}$, $t_c$ is a time at which the light beam passes through a central point of the scan, v is a linear velocity of the light beam on the imaging surface, and d is a minimum distance between the axis of rotation of the reflector and the imaging surface.

14. The method of claim 12, wherein the driving of the oscillating sections causes the light beam to scan the imaging surface at a substantially constant velocity.

15. The method of claim 12, wherein the predetermined mathematical series function comprises a Fourier series.

* * * * *